(12) United States Patent
Huang et al.

(10) Patent No.: US 12,535,393 B2
(45) Date of Patent: Jan. 27, 2026

(54) METHOD AND SYSTEM FOR EVALUATING STRESS CORROSION CRACKING SENSITIVITY OF WELDED COMPONENT

(71) Applicants: East China University of Science and Technology; Shandong Chambroad Holding Group Co., Ltd, Binzhou (CN); SD Chambroad EQPT MFG and Installation Co., Ltd

(72) Inventors: Yuhui Huang, Shanghai (CN); Yunsheng Ma, Shanghai (CN); Fangxin Yang, Shanghai (CN); Fuzhen Xuan, Shanghai (CN); Shantung Tu, Shanghai (CN); Liqiu Zhao, Shanghai (CN); Shengke Wei, Shanghai (CN)

(73) Assignees: East China University of Science and Technology, Shanghai (CN); Shandong Chambroad Holding Group Co., Ltd., Binzhou (CN); SD Chambroad EQPT MFG and Installation Co., Ltd., Shandong (CN)

( * ) Notice: Subject to any disclaimer, the term of this patent is extended or adjusted under 35 U.S.C. 154(b) by 356 days.

(21) Appl. No.: 18/223,913

(22) Filed: Jul. 19, 2023

(65) Prior Publication Data

US 2024/0219277 A1    Jul. 4, 2024

(30) Foreign Application Priority Data

Jan. 3, 2023   (CN) .......................... 202310004118.0

(51) Int. Cl.
*G01N 3/08*   (2006.01)
*G01N 3/00*   (2006.01)
(Continued)

(52) U.S. Cl.
CPC .................. *G01N 3/08* (2013.01); *G01N 3/06* (2013.01); *G01N 21/84* (2013.01); *G01N 23/2251* (2013.01)

(58) Field of Classification Search
CPC . Y02P 10/25; Y02P 10/20; G01L 1/00; G01L 5/0061; G01N 3/42; G01N 3/28;
(Continued)

(56) References Cited

FOREIGN PATENT DOCUMENTS

| CN | 110595908 A | * | 12/2019 | ............... G01N 3/18 |
| JP | H1164326 A | * | 3/1999 | |
| WO | WO-2019101977 A1 | * | 5/2019 | ............... G01N 3/08 |

OTHER PUBLICATIONS

"Corrosion of metals and alloys—Stress corrosion testing—Part 4: Preparation and use of uniaxially loaded tension specimens" Published ISO 7539-4:1989 (Dec. 1989), URL: https://www.iso.org/standard/14317.html, 8 pages.
(Continued)

*Primary Examiner* — Brandi N Hopkins
(74) *Attorney, Agent, or Firm* — Maine Cernota & Curran (57) ABSTRACT

A method and a system for evaluating stress corrosion cracking sensitivity of a welded component are provided. The method includes performing an in-situ tensile test on a welded component to be tested to obtain mechanical property parameters of each zone of the welded component to be tested; determining sizes and positions of notch specimens of the welded component to be tested by means of a finite element simulation method; processing specimens of the welded component to be tested; respectively performing a slow strain rate tensile test on the specimens of the welded component to be tested until the specimens are fractured in both an inert environment and a test environment, so as to obtain reductions of area of notch roots of the specimens of the welded component to be tested; and calculating stress
(Continued)

corrosion cracking sensitivities of various zones of the welded component to be tested.

6 Claims, 4 Drawing Sheets

(51) Int. Cl.
*G01N 3/06* (2006.01)
*G01N 21/84* (2006.01)
*G01N 23/2251* (2018.01)

(58) Field of Classification Search
CPC ............ G01N 3/02; G01N 3/18; G01N 1/286; G01N 3/30; G01N 3/22; G01N 3/48; G01N 17/00; G01N 3/20; G01N 17/04; G01N 3/08; G01N 3/06; G01N 21/84; G01N 23/2251; B23K 9/167; G06F 30/18; G06F 30/23; G06F 17/10; C21C 7/00; E21B 17/1085
USPC .......................................................... 73/862
See application file for complete search history.

(56) References Cited

OTHER PUBLICATIONS

"Corrosion of metals and alloys—Stress corrosion testing—Part 7: Method for slow strain rate testing" Published ISO 7539-7:2005 (Feb. 2005), URL: https://www.iso.org/standard/34209.html, 18 pages.

\* cited by examiner

METHOD AND SYSTEM FOR EVALUATING STRESS CORROSION CRACKING SENSITIVITY OF WELDED COMPONENT

RELATED APPLICATIONS

This patent application claims the benefit and priority of Chinese Patent Application No. 202310004118.0, filed on Jan. 3, 2023, which is incorporated by reference herein in by reference its entirety for all purposes.

FIELD OF THE INVENTION

The present disclosure relates to the technical field of metal corrosion evaluation, and in particular, to a method and a system for evaluating stress corrosion cracking sensitivity of a welded component.

BACKGROUND OF THE INVENTION

Welding is one of the most important manufacturing methods in modern industry, and welding manufacturing is ubiquitous from daily commodities to complex industrial equipment. In a welding process, a temperature gradient change inside a material causes differences in a welded structure in terms of chemical composition, microstructure, crystal structure, etc. A welded component is generally divided into a weld zone, a heat affected zone, and a base material zone. Under the extreme service condition, differences in different zones of a welded component will cause different degrees of mechanical and electrochemical properties differences, and cause failures such as corrosion and fracture, which directly endanger the reliability and security of industrial equipment. Stress corrosion cracking (SCC) refers to a phenomenon that a metal material is suddenly fractured at a value far less than the yield strength of the material under the combined action of stress and corrosion environment, and is a brittle fracture under low stress. Even material with good corrosion resistance, such as stainless steel or a nickel-based alloy, is difficult to avoid stress corrosion cracking in a specific service environment. However, the non-uniformity of the material structure in the welded component significantly increases the risk of stress corrosion cracking. Once the stress corrosion cracking occurs, the industrial production will be seriously affected, and even a major economic losses and personnel injury and death accidents are incurred.

Currently, the evaluation of the stress corrosion cracking sensitivity of the metallic material is mainly carried out using different types of test specimens under simulation of specific service conditions, GB/T 15970 "Corrosion of metals and alloys—Stress corrosion testing" has specified standards for various forms of stress corrosion testing, wherein, comparing the U-shaped specimen immersion test method, the constant load method etc., the slow strain rate stress corrosion test method is a method for rapidly evaluating the stress corrosion cracking sensitivity of a material. However, evaluating the stress corrosion cracking sensitivity of the welded component using the low strain rate stress corrosion test method specified in national standards frequently has inconsistent phenomena with other evaluation methods. The applicant evaluated the stress corrosion cracking sensitivity of a welded component using a constant load test and a slow strain rate test, and it is found that fractures occur in the heat affected zone with the highest strength under constant loading mode and the weld zone with the lowest strength under slow strain loading mode, respectively, therefore, the stress corrosion cracking sensitivity of each zone of the welded component maybe not accurately evaluated by existing evaluation methods.

What is needed, therefore, are a method and a system for evaluating stress corrosion cracking sensitivity of a welded component, so as to enable the stress corrosion cracking sensitivity evaluation of each zone of the welded component to be more accurate.

SUMMARY OF THE INVENTION

The objective of the present disclosure is to provide a method and a system for evaluating stress corrosion cracking sensitivity of a welded component, so as to enable the stress corrosion cracking sensitivity evaluation of each zone of the welded component to be more accurate.

To realize the above objective, the present disclosure provides the following solutions.

A method for evaluating stress corrosion cracking sensitivity of a welded component, including:

a. performing an in-situ tensile test on a welded component to be tested to obtain mechanical property parameters of a base material zone, a weld zone, and a heat affected zone of the welded component to be tested;

b. determining sizes and positions of notch specimens of the welded component to be tested according to the mechanical property parameters of the base material zone, the weld zone and the heat affected zone of the welded component to be tested using a finite element simulation method;

c. processing the welded component to be tested according to the sizes and positions of the notch specimens of the welded component to be tested to obtain specimens of the welded component to be tested with notches respectively located in the base material zone, the weld zone and the heat affected zone;

d. respectively performing slow strain rate tensile tests on the specimens of the welded component to be tested with notches respectively located in the base material zone, the weld zone and the heat affected zone until the specimens are fractured using a slow strain rate tensile testing machine in both an inert environment and a test environment, so as to obtain reductions of area of notch roots of the specimens of the welded component to be tested with notches respectively located in the base material zone, the weld zone and the heat affected zone; the reductions of area of notch roots of the specimens of the welded component to be tested includes the reductions of area of notch roots of the specimens of the welded component to be tested in the inert environment and the reductions of area of notch roots of the specimens of the welded component to be tested in the test environment; and e. calculating stress corrosion cracking sensitivities of the base material zone, the weld zone and the heat affected zone of the welded component to be tested according to reductions of area of notch roots of the specimens of the welded component to be tested with notches respectively located in the base material zone, the weld zone and the heat affected zone.

Optionally, the step of respectively performing a slow strain rate tensile test on the specimens of the welded component to be tested with notches respectively located in the base material zone, the weld zone and the heat affected zone until the specimens are fractured using a slow strain rate tensile testing machine in both an inert environment and a test environment, so as to obtain reductions of area of notch roots of the specimens of the welded component to be tested with notches respectively located in the base material zone, the weld zone and the heat affected zone, specifically includes:

a. respectively performing a slow strain rate tensile test on the specimens of the welded component to be tested with notches respectively located in the base material zone, the weld zone and the heat affected zone until the specimens are fractured using a slow strain rate tensile testing machine in both an inert environment and a test environment, so as to obtain fracture section areas of notch roots of the specimens of the welded component to be tested with notches respectively located in the base material zone, the weld zone and the heat affected zone; the fracture section areas of notch roots of the specimens of the welded component to be tested include the fracture section areas of notch roots of the specimens of the welded component to be tested in the inert environment and the fracture section areas of notch roots of the specimens of the welded component to be tested in the test environment; and b. obtaining the reductions of area of notch roots of the specimens of the welded component to be tested with notches respectively located in the base material zone, the weld zone and the heat affected zone according to fracture section areas of notch roots of the specimens of the welded component to be tested with notches respectively located in the base material zone, the weld zone and the heat affected zone.

Optionally, the step of obtaining the reductions of area of notch roots of the specimens of the welded component to be tested with notches respectively located in the base material zone, the weld zone and the heat affected zone according to fracture section areas of notch roots of the specimens of the welded component to be tested with notches respectively located in the base material zone, the weld zone and the heat affected zone, specifically includes calculating the reductions of area of notch roots of the specimens of the welded component to be tested with notches respectively located in the base material zone, the weld zone and the heat affected zone according to a formula $$\varphi = \frac{A_0 - A_1}{A_0},$$

wherein $\varphi$ denotes a reduction of area of a notch root of a specimen of the welded component to be tested with a notch located in the base material zone, the weld zone or the heat affected zone, $A_0$ denotes an area of a notch root of a specimen of the welded component to be tested with a notch located in the base material zone, the weld zone or the heat affected zone, $A_1$ denotes a fracture section area of a notch root of a specimen of the welded component to be tested with a notch located in the base material zone, the weld zone or the heat affected zone.

Optionally, the step of calculating stress corrosion cracking sensitivities of the base material zone, the weld zone and the heat affected zone of the welded component to be tested according to reductions of area of notch roots of the specimens of the welded component to be tested with notches respectively located in the base material zone, the weld zone and the heat affected zone, specifically includes calculating the stress corrosion cracking sensitivities of the base material zone, the weld zone and the heat affected zone of the welded component to be tested according to a formula $$I = \frac{\varphi_A - \varphi_S}{\phi_A},$$

wherein 1 denotes stress corrosion cracking sensitivity of the base material zone, the weld zone or the heat affected zone of the welded component to be tested, $\varphi_A$ denotes a reduction of area of a notch root of a specimen of the welded component to be tested with a notch located in the base material zone, the weld zone or the heat affected zone in the inert environment, $\varphi_S$ denotes a reduction of area of a notch root of a specimen of the welded component to be tested with a notch located in the base material zone, the weld zone or the heat affected zone in the test environment.

The present disclosure further provides a system for evaluating stress corrosion cracking sensitivity of a welded component, including:

a. a mechanical property parameter determination module configured for performing an in-situ tensile test on a welded component to be tested to obtain mechanical property parameters of a base material zone, a weld zone and a heat affected zone of the welded component to be tested;

b. a notch size determination module configured for determining sizes and positions of notch specimens of the welded component to be tested according to the mechanical property parameters of the base material zone, the weld zone and the heat affected zone of the welded component to be tested using a finite element simulation method;

c. a specimen processing module configured for processing the welded component to be tested according to the sizes and positions of the notch specimens of the welded component to be tested to obtain specimens of the welded component to be tested with notches respectively located in the base material zone, the weld zone and the heat affected zone;

d. a calculation module of reduction of area configured for respectively performing slow strain rate tensile tests on the specimens of the welded component to be tested with notches respectively located in the base material zone, the weld zone and the heat affected zone until the specimens are fractured using a slow strain rate tensile testing machine in both an inert environment and a test environment, so as to obtain reductions of area of notch roots of the specimens of the welded component to be tested with notches respectively located in the base material zone, the weld zone and the heat affected zone; the reductions of area of notch roots of the specimens of the welded component to be tested includes the reductions of area of notch roots of the specimens of the welded component to be tested in the inert environment and the reductions of area of notch roots of the specimens of the welded component to be tested in the test environment; and e. a stress corrosion cracking sensitivity determination module configured for calculating stress corrosion cracking sensitivities of the base material zone, the weld zone and the heat affected zone of the welded component to be tested according to reductions of area of notch roots of the specimens of the welded component to be tested with notches respectively located in the base material zone, the weld zone and the heat affected zone.

Optionally, the calculation module of reduction of area specifically includes:

a. a notch root fracture section area calculation unit configured for performing slow strain rate tensile tests on the specimens of the welded component to be tested with notches respectively located in the base material zone, the weld zone and the heat affected zone until the specimens are fractured using a slow strain rate tensile testing machine in both an inert environment and a test environment, so as to obtain fracture section areas of notch roots of the specimens of the welded component to be tested with notches respectively located in the base material zone, the weld zone and the heat affected zone; the fracture section areas of notch roots of the specimens of the welded component to be tested includes the fracture section areas of notch roots of the specimens of the welded component to be tested in the inert environment and the fracture section areas of notch roots of the specimens of the welded component to be tested in the test environment; and b. a calculation unit of reduction of area configured for obtaining the reductions of area of notch roots of the specimens of the welded component to be tested with notches respectively located in the base material zone, the weld zone and the heat affected zone according to fracture section areas of notch roots of the specimens of the welded component to be tested with notches respectively located in the base material zone, the weld zone and the heat affected zone.

According to the specific embodiments provided in the present disclosure, the present disclosure discloses the following technical effects.

In the present disclosure, respectively in an inert environment and a test environment, using a slow strain rate tensile testing machine to respectively perform a slow strain rate tensile test on the specimens of the welded component to be tested with notches respectively located in different positions until the specimens are fractured, so as to obtain reductions of area of notch roots of the specimens of the welded component to be tested with notches located in different positions; calculating stress corrosion cracking sensitivities of each zone of the welded component to be tested according to reductions of area of notch roots of the specimens of the welded component to be tested with notches located in different positions, so as to clarify the portion with the highest stress corrosion cracking sensitivity in the welded component.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

To describe the technical solutions in the embodiments of the present disclosure or in the prior art more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

The following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall belong to the scope of the present disclosure.

To make the objectives, features, and advantages of the present disclosure clearer and more comprehensible, the following further describes the present disclosure in detail with reference to the accompanying drawings and specific embodiments.

An embodiment of the present disclosure provides a method for evaluating stress corrosion cracking sensitivity of a welded component, including:

a. performing an in-situ tensile test on the welded component to be tested to obtain mechanical property parameters of a base material zone, a weld zone, and a heat affected zone of the welded component to be tested, the mechanical property parameters includes data such as Young's modulus, yield strength and tensile strength, mechanical property parameters of the base material zone, the weld zone, and the heat affected zone of the welded component to be tested are obtained by means of in-situ tensile test at room temperature;

b. determining the size and position of a notch specimen of the welded component to be tested according to the mechanical property parameters of the base material zone, the weld zone and the heat affected zone of the welded component to be tested using a finite element simulation method;

c. processing specimens of the welded component to be tested according to the size and position of the notch specimen of the welded component to be tested to obtain specimens of the welded component to be tested with notches respectively located in the base material zone, the weld zone and the heat affected zone respectively, wherein the number of the specimens of the welded component to be tested with notches is three;

d. respectively performing slow strain rate tensile tests on the specimens of the welded component to be tested with notches respectively located in the base material zone, the weld zone and the heat affected zone until same are fractured using a slow strain rate tensile testing machine in both an inert environment and a test environment, so as to obtain reductions of area of notch roots of the specimens of the welded component to be tested with notches respectively located in the base material zone, the weld zone and the heat affected zone; the reduction of area of notch roots of the specimens of the welded component to be tested includes the reduction of area of notch roots of specimens of the welded component to be tested in the inert environment and reduction of area of notch roots of specimens of the welded component to be tested in the test environment; and e. calculating stress corrosion cracking sensitivities of the base material zone, the weld zone and the heat affected zone of the welded component to be tested according to reductions of area of notch roots of specimens of the welded component to be tested with notches respectively located in the base material zone, the weld zone and the heat affected zone.

In a practical application, the step of respectively performing slow strain rate tensile tests on the specimens of the welded component to be tested with notches respectively located in the base material zone, the weld zone and the heat affected zone until same are fractured by means of a slow strain rate tensile testing machine in both an inert environment and a test environment, so as to obtain reductions of area of notch roots of the specimens of the welded component to be tested with notches respectively located in the base material zone, the weld zone and the heat affected zone includes:

a. respectively performing the slow strain rate tensile tests on specimens of the welded component to be tested with notches respectively located in the base material zone, the weld zone and the heat affected zone until the same are fractured by means of a slow strain rate tensile testing machine in both an inert environment and a test environment, so as to obtain fracture section areas of notch roots of specimens of the welded component to be tested with notches respectively located in the base material zone, the weld zone and the heat affected zone; fracture section areas of notch roots of specimens of the welded component to be tested includes fracture section areas of notch roots of specimens of the welded component to be tested in the inert environment and fracture section areas of notch roots of specimens of the welded component to be tested in the test environment; and b. obtaining the reductions of area of the notch roots of specimens of the welded component to be tested with notches respectively located in the base material zone, the weld zone and the heat affected zone according to the fracture section areas of notch roots of specimens of the welded component to be tested with notches respectively located in the base material zone, the weld zone and the heat affected zone.

In a practical application, the step of the reductions of area of the notch roots of specimens of the welded component to be tested with notches respectively located in the base material zone, the weld zone and the heat affected zone according to the fracture section areas of notch roots of specimens of the welded component to be tested with notches respectively located in the base material zone, the weld zone and the heat affected zone includes calculating the reductions of area of the notch roots of specimens of the welded component to be tested with notches respectively located in the base material zone, the weld zone and the heat affected zone according to the formula $$\varphi = \frac{A_0 - A_1}{A_0},$$

wherein $\varphi$ denotes the reduction of area of the notch root of the specimen of the welded component to be tested with the notch located in the base material zone, the weld zone or the heat affected zone, $A_0$ denotes the area of the notch root of the specimen of the welded component to be tested with the notch located in the base material zone, the weld zone or the heat affected zone, $A_1$ denotes the fracture section area of the notch root of the specimen of the welded component to be tested with the notch located in the base material zone, the weld zone or the heat affected zone.

In a practical application, the step of calculating stress corrosion cracking sensitivities of the base material zone, the weld zone and the heat affected zone of the welded component to be tested according to reductions of area of notch roots of specimens of the welded component to be tested with notches respectively located in the base material zone, the weld zone and the heat affected zone includes calculating the stress corrosion cracking sensitivities of the base material zone, the weld zone and the heat affected zone of the welded component to be tested according to the formula $$I = \frac{\varphi_A - \varphi_S}{\varphi_A},$$

the closer the value of l is to 1, the higher the cracking sensitivity is, wherein l denotes the stress corrosion cracking sensitivity of the base material zone, the weld zone or the heat affected zone of the welded component to be tested, $\varphi_A$ denotes the reduction of area of the notch root of the specimen of the welded component to be tested with the notch located in the base material zone, the weld zone or the heat affected zone in the inert environment, $\varphi_S$ denotes the reduction of area of the notch root of the specimen of the welded component to be tested with the notch located in the base material zone, the weld zone or the heat affected zone in the test environment.

Figure 1:
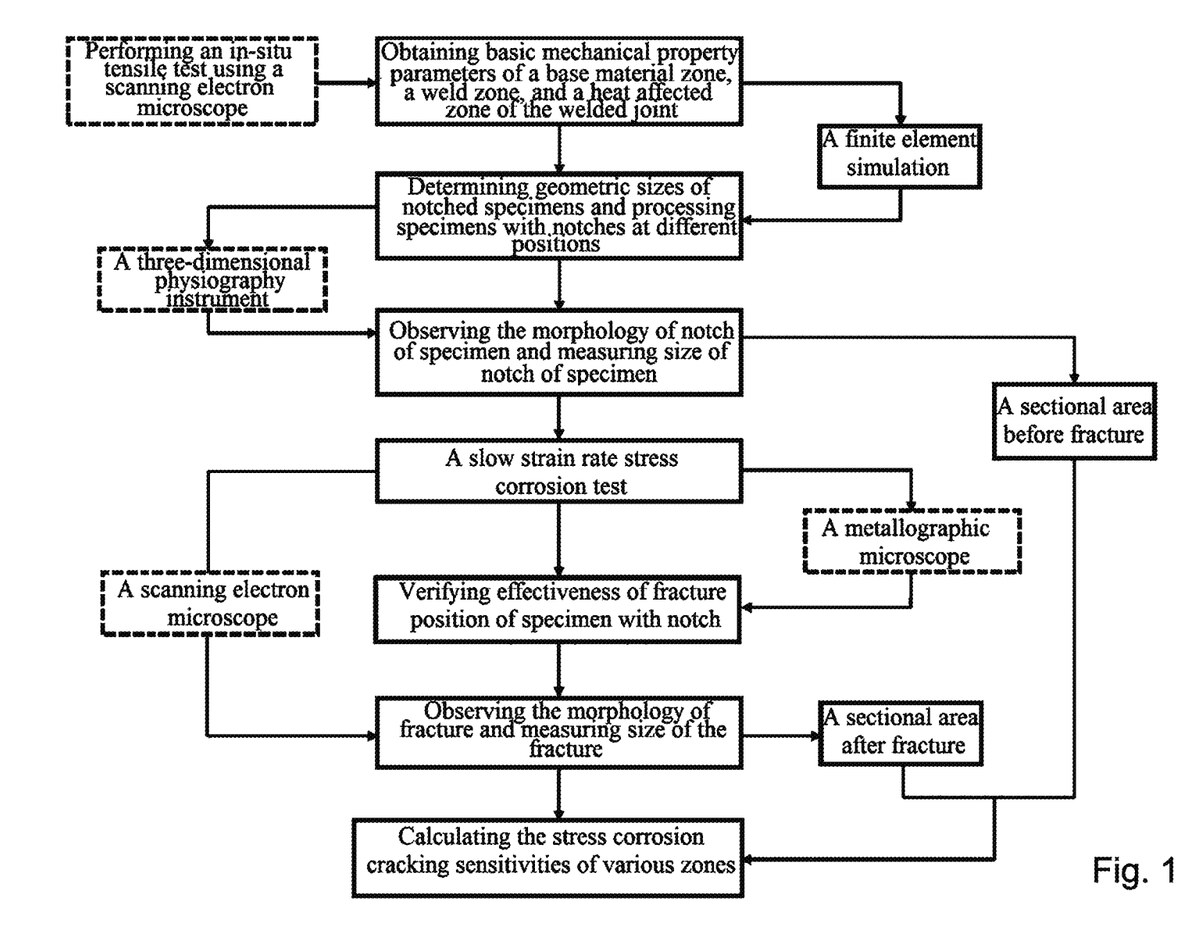
FIG. 1 is a flowchart of a method for evaluating stress corrosion cracking sensitivity of a welded component according to an embodiment of the present disclosure.

An embodiment of the present disclosure provides a more specific method for evaluating stress corrosion cracking sensitivity of a welded component, as shown in FIG. 1:

Step 1: cutting in-situ tensile specimens at typical portions of each zone of the welded component; during the in-situ tensile test, placing the specimens on an in-situ tensile testing machine, selecting a tensile mode, and then selecting an appropriate loading rate for loading, obtaining a tensile curve of the specimen after stretching is completed, and obtaining mechanical property parameters of a base material zone, a weld zone and a heat affected zone of the welded component according to the tensile curve, each set of experiment was repeated three times.

Step 2: determining the basic geometric sizes of the specimens with reference to the size of the slow strain rate tensile specimen specified in the national standard GB/T 15970, and performing the simulation via finite element analysis software such as ABAQUS, so as to determine the size of the notch where the fracture position of the specimen is guaranteed to be located at the notch. The boundary load is determined to be fixed on one side and displaced and stretched on the other side; and the grid at the pitch section and the notch root are refined, and grid independence verification is performed. According to the position of the weld in the slow strain rate tensile test specimen of the welded component, the mechanical property parameters of each zone of the welded component obtained in step 1 are assigned to corresponding zones of the simulation specimen. Firstly, a notch position is determined in a certain zone of the welded component, and the tensile results of the zones with notches with different bottom radii are simulated, thereby determining the bottom radii of the notches at which fracture can occur. Secondly, bottom radii of notches in other notch position intervals are simulated, statistics of simulation results thereof are collected, and notch sizes enabling fracture to all occur at the positions of notches are determined, so as to determine the notch size of a processed specimen.

Step 3: processing the slow strain rate tensile specimens according to the size and position of the notch obtained in step 2. The specimens are cleaned and the basic sizes of the specimens, including the diameter and length of the specimen at the pitch section, are tested using a vernier caliper. A three-dimensional physiography instrument is used to measure a notch portion of a specimen with the notch, so as to obtain accurate morphological data at the notch, including a width, a depth, bottom topographic and the like of a notch, the depth of the notch portion of the specimen should be tested, the depth of the notch is subtracted from the diameter of the specimen to obtain the diameter of the notch portion, the data in the step should be tested at least six times to obtain an average value, and the cross-sectional area at the notch root is calculated.

Step 4: performing the slow strain rate tensile tests on the notch specimen by means of a slow strain rate tensile testing machine; simulating an experimental environment according to actual working conditions; the slow strain rate testing machine should be able to select a deformation rate, and the power thereof is large enough to generate the required load, and the strain rate value set in the test is set according to the range specified by the national standard GB/T15970, the testis stopped when the specimen was completely fractured.

Step 5: measuring the fracture cross-sectional area of the fractured specimen by means of a scanning electron microscope or a three-dimensional photography instrument. The fracture photography of the fractured specimen should be observed by means of the scanning electron microscope, the stress corrosion cracking sensitivities in different zones of the welded component is preliminarily judged by means of the fracture photography characteristic, and the fracture cross-sectional area is further calculated by means of the scanning electron microscope. If a fracture cross-section of a fractured specimen is photographed by means of a three-dimensional photography instrument, a fracture depth at the fracture should be tested and obtained; the depth of the fracture position of the specimen should be tested, the diameter of the fracture portion is obtained by subtracting the fracture depth from the specimen diameter and should be tested at least six times to obtain an average value.

Step 6: cutting the fractured specimen along the direction of the vertical cross section to form a semi-cylindrical specimen; observing the microscopic metallographic structure at the fracture position of the specimen with a light mirror, so as to ensure the consistency between the fracture position and the position of the notch of the specimen; if the fracture position is located at the notch root, the fracture data is valid; and if the fracture position is not located at the notch root, the fracture data is invalid.

Step 7: obtaining the cross sectional area of the notch and the cross sectional area of the fracture by means of the diameters tested before and after the test, calculating the reduction of area of each valid specimen, and then calculating the stress corrosion cracking sensitivity of each zone using a formula.

An embodiment of the present disclosure provides a system for evaluating stress corrosion cracking sensitivity of a welded component corresponding to the above method, including:

a. a mechanical property parameter determination module configured for performing an in-situ tensile test on the welded component to be tested to obtain mechanical property parameters of a base material zone, a weld zone and a thermal affected zone of the welded component to be tested;

b. a notch size determination module configured for determining the size and position of a notch specimen of the welded component to be tested according to the mechanical property parameters of the base material zone, the weld zone and the thermal influence zone of the welded component to be tested by means of a finite element simulation method;

c. a specimen processing module configured for processing specimens of the welded component to be tested according to the size and position of the notch specimen of the welded component to be tested to obtain specimens of the welded component to be tested with notches respectively located in the base material zone, the weld zone and the heat affected zone respectively;

d. a calculation module of reduction of area configured for respectively performing slow strain rate tensile tests on the specimens of the welded component to be tested with notches respectively located in the base material zone, the weld zone and the heat affected zone until same are fractured using a slow strain rate tensile testing machine in both an inert environment and a test environment, so as to obtain reductions of area of notch roots of the specimens of the welded component to be tested with notches respectively located in the base material zone, the weld zone and the heat affected zone; the reduction of area of notch roots of the specimens of the welded component to be tested includes reduction of area of notch roots of specimens of the welded component to be tested in the inert environment and reduction of area of notch roots of specimens of the welded component to be tested in the test environment; and e. a stress corrosion cracking sensitivity determination module for calculating stress corrosion cracking sensitivities of the base material zone, the weld zone and the heat affected zone of the welded component to be tested according to reductions of area of notch roots of specimens of the welded component to be tested with notches respectively located in the base material zone, the weld zone and the heat affected zone.

In a practical application, the calculation module of reduction of area specifically includes:

a. a notch root fracture cross-sectional area calculating unit for respectively performing the slow strain rate tensile tests on specimens of the welded component to be tested with notches respectively located in the base material zone, the weld zone and the heat affected zone until the same are fractured using a slow strain rate tensile testing machine in both an inert environment and a test environment, so as to obtain fracture section areas of notch roots of specimens of the welded component to be tested with notches respectively located in the base material zone, the weld zone and the heat affected zone; fracture section areas of notch roots of specimens of the welded component to be tested includes fracture section areas of notch roots of specimens of the welded component to be tested in the inert environment and fracture section areas of notch roots of specimens of the welded component to be tested in the test environment; and b. a calculating unit of reduction of area for obtaining the reductions of area of the notch roots of specimens of the welded component to be tested with notches respectively located in the base material zone, the weld zone and the heat affected zone according to the fracture section areas of notch roots of specimens of the welded component to be tested with notches respectively located in the base material zone, the weld zone and the heat affected zone.

The present disclosure further provides a more specific embodiment for introducing the above method, wherein the tested material of the present embodiment is a 30Cr2Ni4MoV welded component, the welding process is arc welding and surfacing welding; after being welded, the specimen is maintained at a temperature of 580° C. for 20 h, the chemical compositions is as shown in Table 1. The material first obtains the mechanical property parameters of each zone of the welded component of the material by means of an in-situ tensile test. In the in-situ tensile test, a specimen is first placed on an in-situ tensile testing machine, a tensile mode is selected, a loading rate is 2.4×10−4 mm/min, then loading is selected, and a tensile curve of the material can be obtained after stretching is completed. Table 2 is test obtained mechanical property parameters of different zones of the welded component.

TABLE 1

Chemical composition of base material and weld material of the 30Cr2Ni4MOV rotor steel

| | Chemical component (wt. %) | | | | | | | | |
|---|---|---|---|---|---|---|---|---|---|
| Material | C | Si | Mn | P | S | Cr | Ni | Mo | V |
| Base material | 0.24 | 0.01 | 0.27 | 0.003 | 0.002 | 1.73 | 3.65 | 0.37 | 0.21 |
| weld | 0.12 | 0.15 | 1.25 | 0.005 | 1.20 | 1.20 | 2.51 | 0.74 | 0.1 |

TABLE 2

Mechanical property parameters of different zones of the test material

| Zone | Young's modulus MPa | Yield strength MPa |
|---|---|---|
| Base material(BM) | 180137 | 772 |
| Heat affected zone (HAZ) | 229974 | 918 |
| Weld (WM) | 185638 | 791 |

Figure 2A:
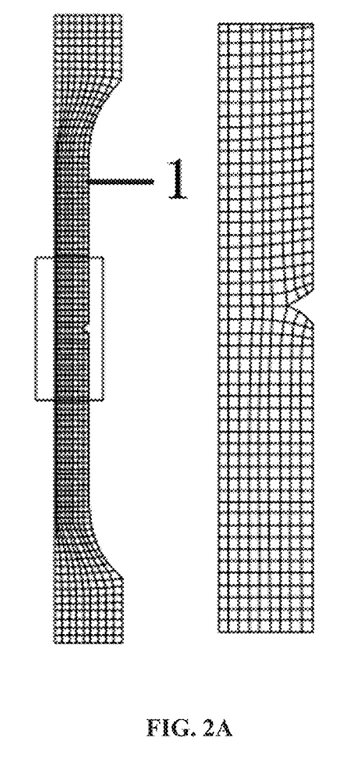
FIGS. 2A-2C show an overall size view and a notch size view of a tensile specimen according to an embodiment of the present invention.
Figure 2B:
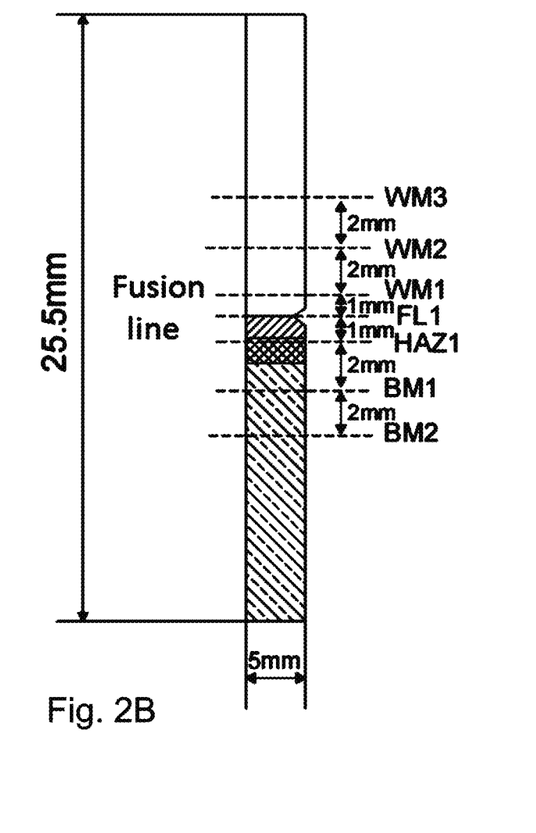
Figure 2C:
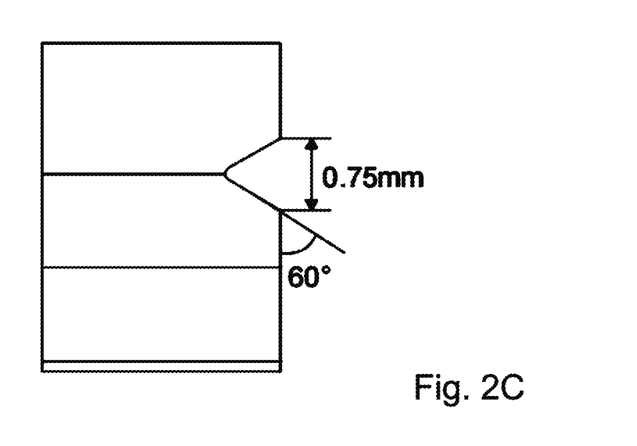

After obtaining the mechanical property parameters of the material, the tensile specimens are modeled using the finite element software ABAQUS. The basic geometric sizes of the specimens are shown in FIGS. 2A-2C. The boundary load is determined to be fixed on one side and displaced and stretched on the other side. And the mechanical property parameters of each zone of the welded component obtained in step 1 are assigned to corresponding zones of the simulation specimen. The analysis step is set to be a power explicit analysis step, and after grid independence verification is completed, the grid at the pitch section is refined, and a model grid 1 is as shown in FIG. 2A. After the basic modeling is completed, a notch is drawn in each zone of the specimen for simulating, and the value of the notch width is continuously modified. The simulation selects the fusion line and seven positions respectively 1 mm, 3 mm and 5 mm away from the fusion line on the two sides, and the notches are named FLI, WM1, WM2, WM3, HAZ1, BM1 and BM2 respectively, and the schematic diagram is as shown in FIG. 2B. Firstly, the notches are positioned on the fusion line, and the tensile fracture conditions at different values of notch spacing at both sides are simulated.

Table 3 shows the tensile fracture conditions at different distances between both sides of the notch when the notch is located at the fusion line, and it can be seen that the fracture does not occur at the distance between both sides of the notch is 0.2R (R is the radius of the non-notches pitch section of the specimen), and the fracture occurs at the distance between both sides of the notch is 0.3R. Therefore, the distance between notch sides of the notch is approximately 0.2R~0.3R.

TABLE 3

Tensile fracture conditions at different distances between both sides of the notch when the notch is located at the fusion line

| Notch width | No-notches | 0.1 R | 0.2 R | 0.3 R |
|---|---|---|---|---|
| Position of maximum Mises stress | Heat affected zone | Heat affected zone | Above the fusion line | Fusion line |
| Whether fracture position is at the notch | No | No | No | Yes |

The tensile fracture conditions at different positions of the notches when the distance between both sides of the botch is respectively 0.2R and 0.3R is simulated. Table 4 shows the tensile fracture conditions when the notches are located at different positions on the fusion line with the distance between both sides of the notch is 0.2R and 0.3R, the result shows that the distance between both sides of the notch is increased to 0.3R, i. e., 0.75 mm, and the notch of the specimen is located in each zone of the material to ensure that the fracture occurs at the notch portion, and finally, the distance between both sides of the notch of the specimen is determined to be 0.3R, i. e., 0.75 mm, and the geometric sizes of the notches are as shown in FIG. 2C.

TABLE 4

Tensile fracture conditions at different positions of the notches when the distance between both sides of the botch

| Notch position | Notch width | Maximum Mises stress (MPa) | Position of maximum Mises stress | Fracture position |
|---|---|---|---|---|
| 1 | 0.2r | 1007 | Fusion line | Notch |
| 3 | 0.2r | 970.2 | Fusion line | Notch |
| 5 | 0.2r | 925.4 | Fusion line | Notch |
| 1 | 0.3r | 1030 | Fusion line | Notch |
| 3 | 0.3r | 952.7 | Fusion line | Notch |
| 5 | 0.3r | 922.2 | Notch | Notch |

TABLE 4-continued

Tensile fracture conditions at different positions of the
notches when the distance between both sides of the botch

| Notch position | Notch width | Maximum Mises stress (MPa) | Position of maximum Mises stress | Fracture position |
|---|---|---|---|---|
| −1 | 0.2r | 1084 | Notch | Weld zone |
| −3 | 0.2r | 1014 | BM-HAZ boundary line | Weld zone |
| −5 | 0.2r | 984.9 | BM-HAZ boundary line | Weld zone |
| −1 | 0.3r | 1084 | Notch | Notch |
| −3 | 0.3r | 1084 | BM-HAZ boundary line | Notch |
| −5 | 0.3r | 1006 | BM-HAZ boundary line | Notch |

The tensile specimens are machined after the notch size is determined, the basic geometrical sizes of the specimens referring to the relevant specifications for the SSRT specimens in National Standard GB/T 15970. Specimens with notches located in the weld zone, the heat affected zone and the base material are respectively customized, and the number of each specimen is three.

After the diameter of the notch portion of each specimen is obtained, the specimens are ultrasonically cleaned using deionized water and absolute ethanol for 5 minutes respectively, and blown dry. The three-dimensional physiography instrument is used to measure the size of the notch of each specimen; the depth of the notch of each specimen is tested respectively; the depth of the notch is subtracted from the diameter of the specimen to obtain the diameter of the notch portion, the data in the step should be tested at least six times to obtain an average value. Table 5 shows the minimum cross-sectional areas calculated for the morphological curves of notches of the specimens tested for the base material (BM), weld (WM) and heat affected zone (HAZ) of the three parallel specimens, respectively.

Figure 3:
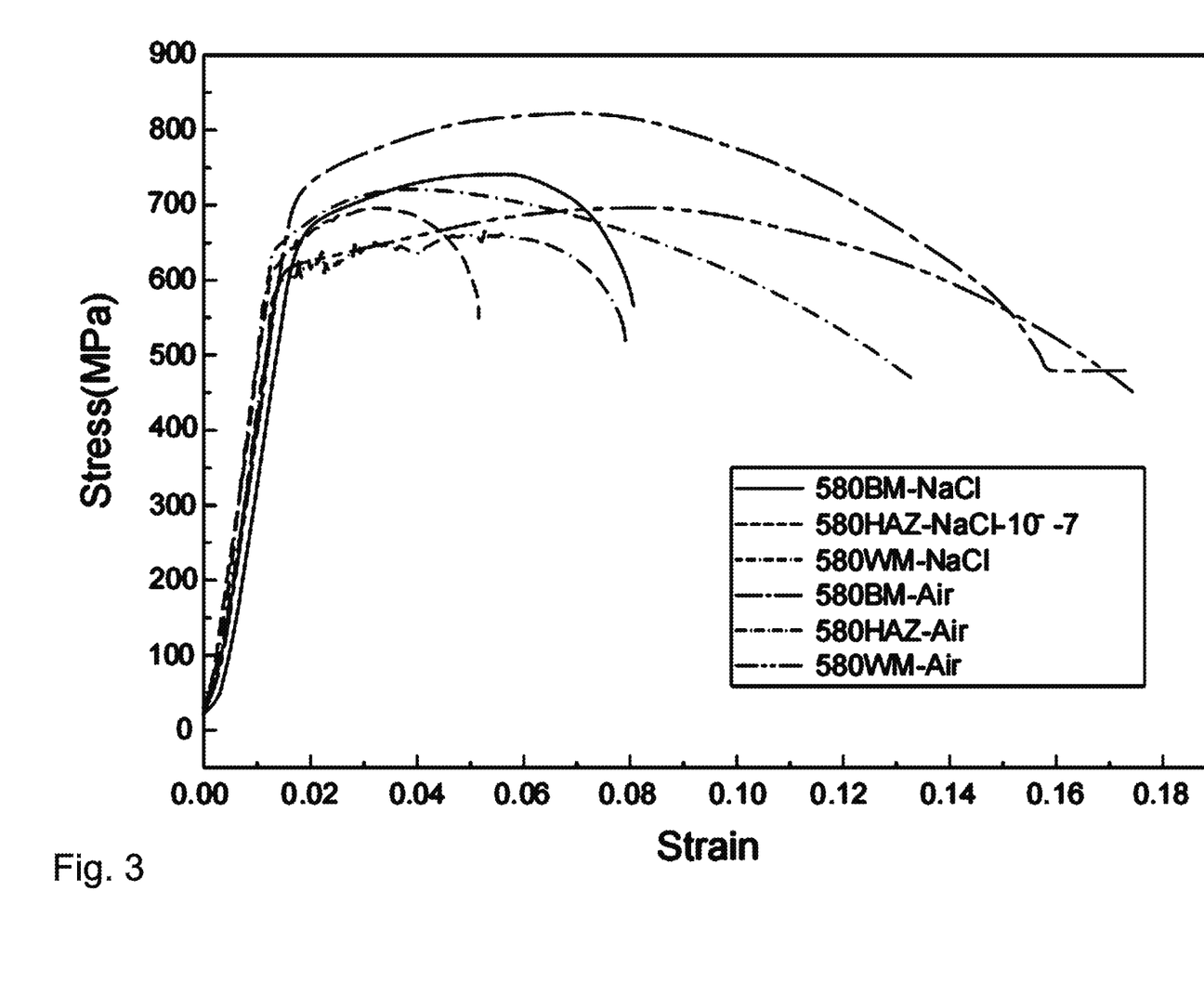
FIG. 3 is a stress and strain curve diagram of zones of a Cr2Ni4MoV welded component according to an embodiment of the present disclosure.

After the specimen cleaning is completed, a Cortest high temperature and high pressure stress corrosion testing machine is used to perform a slow strain rate tensile test. The strain rate experimentally selected was 10−6/s, the test temperature is 180° C., the corrosive environment is 3.5 w.t. % NaCl, the tensile rate set on the machine is 25.5E-6 mm/s. The specimens are then mounted on a high temperature and high pressure reactor, the bolts are sequentially tightened according to the designations, the upper displacement and force sensors are mounted, and heating commences. After being heated to 180° C., the parameters are set, and then the preload is clicked; when the load reaches a predetermined value, the test is started; after the specimen is fractured, the specimen is removed; and the fractured specimen is ultrasonically cleaned using deionized water and anhydrous ethyl alcohol for 5 minutes each, and is blown dry for use. FIG. 3 is a stress and strain curve diagram of each zone obtained by performing a slow strain rate tensile test on the material.

The scanning electron microscope is used to photograph the sectional view of the fracture surface of the fractured specimen, and measure a stress corrosion fracture area thereof.

Cutting the fractured specimen along the direction of the vertical cross-section to prepare a 5 mm-long semi-cylindrical specimen; then, sealing the semi-cylindrical specimen by epoxy resin; and observing the microscopic metallographic structure at the fracture portion thereof by using a light mirror, so as to ensure that the tissue structure of the fracture portion of the specimen is the tissue expected before the test.

After observation using a light mirror, a fracture sectional view of a fractured specimen is captured by using the scanning electron microscope, the cross-sectional areas of a mechanical crack and an SCC crack are obtained by measurement, and a stress corrosion cracking sensitivity calculation formula is used to calculate and obtain values of stress corrosion cracking sensitivity of each zone of the specimen by means of comparing reductions of area obtained stretching specimen in air, as shown in Table 6. It can be seen therefrom that in the base material, the weld and the heat affected zone, the heat affected zone has the strongest stress corrosion cracking sensitivity, which is consistent with the highest yield strength of the heat affected zone. Through the notch slow strain rate tensile test, the stress corrosion cracking sensitivity in different zones of the welded component can be quickly and effectively evaluated.

TABLE 5

Minimum cross-sectional areas of different specimens

| | Specimen number | | | | | |
|---|---|---|---|---|---|---|
| | BM1 | BM2 | BM3 | WM1 | WM2 | WM3 |
| Minimum cross-sectional area(um$^2$) | 1193025 | 1224327 | 986738 | 1292722 | 1080851 | 1236469 |

| | Specimen number | | | | | |
|---|---|---|---|---|---|---|
| | HAZ1 | HAZ2 | HAZ3 | FL1 | FL2 | FL3 |
| Minimum cross-sectional area(um$^2$) | 1193025 | 1351000 | 1245987 | 1186135 | 1276082 | 848330 |

TABLE 6

Stress corrosion cracking sensitivity of each zone of the welded material

| Notch position | Original sectional area (mm²) | Stress corrosion fracture diameter(mm) | Sectional area after fracture(mm²) | Reduction of area | Stress corrosion cracking sensitivity |
|---|---|---|---|---|---|
| BM | 11.05323989 | 2.90809 | 6.64210241 | 39.908095% | 0.4605 |
| HAZ | 10.98853791 | 3.23137 | 8.200932904 | 25.3682977% | 0.6571 |
| WM | 10.85145789 | 3.0424 | 7.269800721 | 33.0062302% | 0.5538 |

In the present disclosure, a round bar specimen with a pre-fabricated notch is used for the slow strain rate tensile test, and the stress corrosion cracking sensitivity of different zones of a welded component is evaluated by acquiring fracture positions and measuring the reductions of area at the notch root, Compared with the traditional method for assessing corrosion cracking sensitivity at the slow strain rate, the present disclosure changes the position of the notch on the specimen, making the fracture position occur in a target zone, so as to evaluate the stress corrosion cracking sensitivity in different zones of the base material zone, the weld zone and the heat affected zone of the welding structure.

The slow strain rate stress corrosion test, compared with other test methods, is a method for rapidly evaluating the stress corrosion cracking sensitivity of a material, however, because welding processes of different components are different, a micro-structure, mechanical performance, electrochemical performance, and the like of the base material zone, the weld zone and the heat affected zone of the welded component are different, as a result, the results obtained by using the stress corrosion cracking sensitivity test method specified in GB/T will have certain differences, therefore, there is no explicit method for accurately assessing the stress corrosion cracking sensitivity thereof at present, and the present disclosure performs the slow strain rate tensile test on a slow strain rate tensile specimen with a notch whose the fracture position is limited, the stress corrosion cracking sensitivity can be accurately evaluated in different zones of the welded component both simply and quickly.

The present disclosure enables simple and rapid measurement of stress corrosion cracking sensitivity of the base material zone, heat affected zone, and weld zone in the welded component.

The embodiments in this description are described progressively, each embodiment focuses on a difference from other embodiments, and reference may be made to each other for the same or similar parts of the embodiments. Since the system disclosed in the embodiments corresponds to the method disclosed in the embodiments, the description thereof is relatively simple, and for the related parts, reference can be made to the description of the method.

The principle and embodiments of the present disclosure are described herein through specific examples, and the description of the above embodiments is only used to help understand the method and core idea of the present disclosure; In addition, a person of ordinary skill in the art may make modifications to the specific implementations and application scopes according to the ideas of the present disclosure. In conclusion, the content of the description shall not be construed as a limitation on the present disclosure.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

Although the present application is shown in a limited number of forms, the scope of the disclosure is not limited to just these forms, but is amenable to various changes and modifications. The present application does not explicitly recite all possible combinations of features that fall within the scope of the disclosure. The features disclosed herein for the various embodiments can generally be interchanged and combined into any combinations that are not self-contradictory without departing from the scope of the disclosure. In particular, the limitations presented in dependent claims below can be combined with their corresponding independent claims in any number and in any order without departing from the scope of this disclosure, unless the dependent claims are logically incompatible with each other.

What is claimed is:

1. A method for evaluating stress corrosion cracking sensitivity of a welded component, comprising:
    performing an in-situ tensile test on a welded component to be tested to obtain mechanical property parameters of a base material zone, a weld zone, and a heat affected zone of the welded component to be tested;
    determining sizes and positions of notch specimens of the welded component to be tested according to the mechanical property parameters of the base material zone, the weld zone and the heat affected zone of the welded component to be tested using a finite element simulation method;
    processing the welded component to be tested according to the sizes and positions of the notch specimens of the welded component to be tested to obtain specimens of the welded component to be tested with notches respectively located in the base material zone, the weld zone and the heat affected zone;
    respectively performing slow strain rate tensile tests on the specimens of the welded component to be tested with notches respectively located in the base material zone, the weld zone and the heat affected zone until the specimens are fractured using a slow strain rate tensile testing machine in both an inert environment and a test environment, so as to obtain reductions of area of notch roots of the specimens of the welded component to be tested with notches respectively located in the base material zone, the weld zone and the heat affected zone, the reductions of area of notch roots of the specimens of the welded component to be tested comprising the reductions of area of notch roots of the specimens of the welded component to be tested in the inert environment and the reductions of area of notch roots of the specimens of the welded component to be tested in the test environment; and calculating stress corrosion cracking sensitivities of the base material zone, the weld zone and the heat affected zone of the welded component to be tested according to reductions of area of notch roots of the specimens of the welded component to be tested with notches respectively located in the base material zone, the weld zone and the heat affected zone.

2. The method for evaluating stress corrosion cracking sensitivity of a welded component according to claim 1, wherein the step of respectively performing slow strain rate tensile tests on the specimens of the welded component to be tested with notches respectively located in the base material zone, the weld zone and the heat affected zone until the specimens are fractured using a slow strain rate tensile testing machine in both an inert environment and a test environment, so as to obtain reductions of area of notch roots of the specimens of the welded component to be tested with notches respectively located in the base material zone, the weld zone and the heat affected zone, specifically comprises:

respectively performing slow strain rate tensile tests on the specimens of the welded component to be tested with notches respectively located in the base material zone, the weld zone and the heat affected zone until the specimens are fractured using a slow strain rate tensile testing machine in both an inert environment and a test environment, so as to obtain fracture section areas of notch roots of the specimens of the welded component to be tested with notches respectively located in the base material zone, the weld zone and the heat affected zone, wherein the fracture section areas of notch roots of the specimens of the welded component to be tested comprises the fracture section areas of notch roots of the specimens of the welded component to be tested in the inert environment and the fracture section areas of notch roots of the specimens of the welded component to be tested in the test environment; and obtaining the reductions of area of notch roots of the specimens of the welded component to be tested with notches respectively located in the base material zone, the weld zone and the heat affected zone according to fracture section areas of notch roots of the specimens of the welded component to be tested with notches respectively located in the base material zone, the weld zone and the heat affected zone.

3. The method for evaluating stress corrosion cracking sensitivity of a welded component according to claim 2, wherein the step of obtaining the reductions of area of notch roots of the specimens of the welded component to be tested with notches respectively located in the base material zone, the weld zone and the heat affected zone according to fracture section areas of notch roots of the specimens of the welded component to be tested with notches respectively located in the base material zone, the weld zone and the heat affected zone, specifically comprises:

calculating the reductions of area of notch roots of the specimens of the welded component to be tested with notches respectively located in the base material zone, the weld zone and the heat affected zone according to a formula $$\varphi = \frac{A_0 - A_1}{A_0},$$

wherein $\varphi$ denotes a reduction of area of a notch root of a specimen of the welded component to be tested with a notch located in the base material zone, the weld zone or the heat affected zone, $A_0$ denotes an area of a notch root of a specimen of the welded component to be tested with a notch located in the base material zone, the weld zone or the heat affected zone, $A_1$ denotes a fracture section area of a notch root of a specimen of the welded component to be tested with a notch located in the base material zone, the weld zone or the heat affected zone.

4. The method for evaluating stress corrosion cracking sensitivity of a welded component according to claim 1, wherein the step of calculating stress corrosion cracking sensitivities of the base material zone, the weld zone and the heat affected zone of the welded component to be tested according to reductions of area of notch roots of the specimens of the welded component to be tested with notches respectively located in the base material zone, the weld zone and the heat affected zone, specifically comprises:

calculating the stress corrosion cracking sensitivities of the base material zone, the weld zone and the heat affected zone of the welded component to be tested according to a formula $$I = \frac{\varphi_A - \varphi_S}{\varphi_A},$$

wnerein I denotes stress corrosion cracking sensitivity of the base material zone, the weld zone or the heat affected zone of the welded component to be tested, $\varphi_A$ denotes a reduction of area of a notch root of a specimen of the welded component to be tested with a notch located in the base material zone, the weld zone or the heat affected zone in the inert environment, $\varphi_S$ denotes a reduction of area of a notch root of a specimen of the welded component to be tested with a notch located in the base material zone, the weld zone or the heat affected zone in the test environment.

5. A system for evaluating stress corrosion cracking sensitivity of a welded component, comprising:

a mechanical property parameter determination module configured for performing an in-situ tensile test on a welded component to be tested to obtain mechanical property parameters of a base material zone, a weld zone and a heat affected zone of the welded component to be tested;

a notch size determination module configured for determining sizes and positions of notch specimens of the welded component to be tested according to the mechanical property parameters of the base material zone, the weld zone and the heat affected zone of the welded component to be tested using a finite element simulation method;

a specimen processing module configured for processing the welded component to be tested according to the sizes and positions of the notch specimens of the welded component to be tested to obtain specimens of the welded component to be tested with notches respectively located in the base material zone, the weld zone and the heat affected zone;

a calculation module of reduction of area configured for respectively performing slow strain rate tensile tests on the specimens of the welded component to be tested with notches respectively located in the base material zone, the weld zone and the heat affected zone until the specimens are fractured using a slow strain rate tensile testing machine in both an inert environment and a test environment, so as to obtain reductions of area of notch roots of the specimens of the welded component to be tested with notches respectively located in the base material zone, the weld zone and the heat affected zone; the reductions of area of notch roots of the specimens of the welded component to be tested comprises the reductions of area of notch roots of the specimens of the welded component to be tested in the inert environment and the reductions of area of notch roots of the specimens of the welded component to be tested in the test environment; and a stress corrosion cracking sensitivity determination module configured for calculating stress corrosion cracking sensitivities of the base material zone, the weld zone and the heat affected zone of the welded component to be tested according to reductions of area of notch roots of the specimens of the welded component to be tested with notches respectively located in the base material zone, the weld zone and the heat affected zone.

6. The system for evaluating stress corrosion cracking sensitivity of a welded component according to claim 5, wherein the calculation module of reduction of area specifically comprises:

a notch root fracture section area calculation unit configured for respectively performing slow strain rate tensile tests on the specimens of the welded component to be tested with notches respectively located in the base material zone, the weld zone and the heat affected zone until the specimens are fractured using a slow strain rate tensile testing machine in both an inert environment and a test environment, so as to obtain fracture section areas of notch roots of the specimens of the welded component to be tested with notches respectively located in the base material zone, the weld zone and the heat affected zone; the fracture section areas of notch roots of the specimens of the welded component to be tested comprises the fracture section areas of notch roots of the specimens of the welded component to be tested in the inert environment and the fracture section areas of notch roots of the specimens of the welded component to be tested in the test environment; and a calculation unit of reduction of area configured for obtaining the reductions of area of notch roots of the specimens of the welded component to be tested with notches respectively located in the base material zone, the weld zone and the heat affected zone according to fracture section areas of notch roots of the specimens of the welded component to be tested with notches respectively located in the base material zone, the weld zone and the heat affected zone.

\* \* \* \* \*